UNITED STATES PATENT OFFICE.

JOSEPH FREIHERR VON MERING, OF HALLE-ON-THE-SAALE, GERMANY.

ACIDYL COMPOUND OF PARA-OXYPHENYLURETHAN ETHERS.

SPECIFICATION forming part of Letters Patent No. 541,489, dated June 25, 1895.

Application filed September 23, 1893. Serial No. 486,321. (Specimens.) Patented in Germany November 12, 1892, No. 69,328, and in Belgium December 10, 1892, No. 102,518.

*To all whom it may concern:*

Be it known that I, JOSEPH FREIHERR VON MERING, a subject of the German Emperor, residing at Halle-on-the-Saale, Germany, have invented a Production of Acidyl Combinations of the Ethers of the Para-Oxyphenylurethans, (for which I have obtained Letters Patent in Germany No. 69,328, dated November 12, 1892, and in Belgium, No. 102,518, dated December 10, 1892;) and I do hereby declare the following to be a full, clear, and exact description of the invention.

My invention relates to the production of acidyl combinations of the ethers of the para-oxyphenylurethans, and has for its object the production of antipyretic and analgesic bodies for use as medicinal agents, to which end the invention consists in the process of obtaining said bodies and in the product. The composition of the ethers of the para-oxyphenylurethans corresponds to the chemical formula:

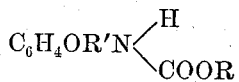

in which R and R' represent any desired alcohol radicle. By substituting an acidyl group (according to the present invention only acetyl ($COCH_3$), propionyl ($COCH_2CH_3$) and benzoyl ($COC_6H_5$) are intended to be used as acidyl) for the hydrogen atom directly combined with the nitrogen atom of such para-oxyphenylurethans, the said product of the present invention will be obtained. The chemical formula of such product therefore runs as follows:

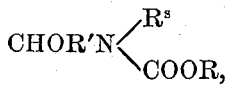

in which $R^3$ represents one of the acidyl groups, $COCH_3$ and $COCH_2CH_3$ and $COC_6H_5$, while R and R' represent, as already stated, any desired alcohol radicle.

The mentioned ethers of the para-oxyphenylurethans to be employed are practically obtained by the action of chlor-carbonic acid alkylether upon the para-amidophenyl ethers and for the purpose of combining the same with the said acidyl groups, i. e., of substituting the latter for the hydrogen atom directly combined with the nitrogen atom of the said para-oxyphenylurethans, they are subjected to the action of acidyl reagents suitably composed of the said acidyl groups in combination with oxygen $(COCH_3)_2O$; $(COCH_2CH_3)_2O$; $(COC_6H_5)_2O$; or with halogen, ($COCH_3Cl$, &c.), or with hydroxyl ($COCH_3OH$, &c.)

The ensuing reactions are shown in the following stoicheiometric formulæ, in which the combining with acetyl is represented as an example:

1. 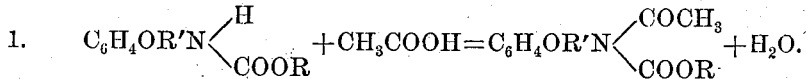

2. 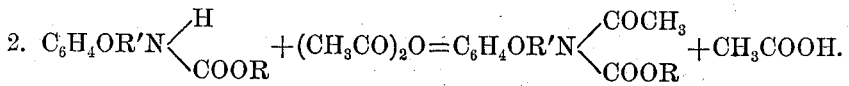

3. 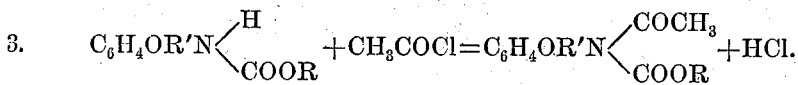

The following example clearly describes the process of combining with acetyl.

*Production of para-methoxyphenylacetylaethylurethan.*—I heat about ten kilos para-methoxyphenylaethylurethan with a like proportion of acetic acid anhydrid, preferably under pressure, for about one hour, after which the excess of acetic acid anhydrid is distilled off and the residue allowed to crystallize. In a similar manner other acetyl combinations of ethers of para-oxyphenylurethan can be obtained by substituting the desired urethan ether in lieu of those above referred to; and, as heretofore stated, the acetic acid anhydrid may be replaced by another acetylic agent. If, on the other hand, a propionylic or benzoylic agent is used in lieu of an acetylic agent, the corresponding propionyl or benzoyl combinations are obtained, and for this purpose propionylic or benzoylic agents corresponding to the described acetylic agents, as propionic acid, or propionic acid anhydrid, or propionylchlorid, or benzoic acid anhydrid, or benzoylchlorid may be employed, the mode of procedure and the proportions of ingredients being substantially the same as in the production of the acetyl combinations.

The products obtained by the process described are characteristic bodies that crystallize readily, are not easily soluble in cold water, but dissolve in alcohol or benzene as well as in glacial acetic acid, and possess marked antipyretic and analgetic properties, as it has been shown that a dose of 0.05 grams will reduce a fever temperature from three to four degrees centigrade in a comparatively short time, and said products constitute therefore appropriate and valuable medicinal agents, which may be administered in doses varying from one-half to one gram, either in the form of powders or pills, or in the form of a solution.

By the described process the following combinations can be obtained:

First, para-methoxyphenylacetylaethyluerthan:

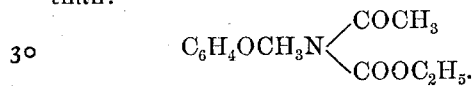

Small white needles, melting point about 60° to 61° centigrade.

Second, para-aethoxyphenylacetylmethylurethan:

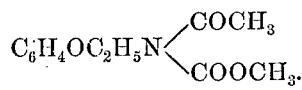

Separates out of glacial acetic acid in the form of thin blades of lamellæ; melting point about 84° to 86° centigrade.

Third, para-aethoxyphenylacetylaethylurethan:

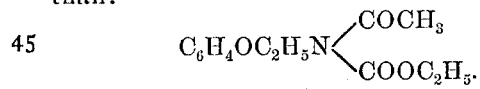

Crystallizes out of glacial acetic acid in the form of hard needles; melting point about 95° centigrade.

Fourth, para-aethoxyphenylacetylamylurethan:

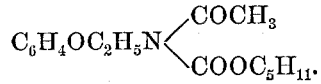

In the form of thin white leaves or blades; melting point about 47° to 48° centigrade.

Fifth, para-aethoxyphenylpropionylaethylurethan:

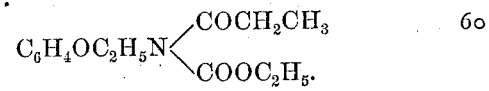

In the form of white leaves; melting point about 85° to 86° centigrade.

Sixth, para-methoxyphenylbenzoylpropylurethan:

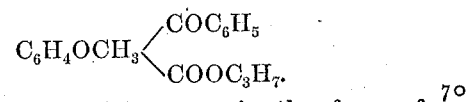

Crystallizes out of benzene in the form of white needles; melting point about 78° to 80° centigrade.

Seventh, para-butoxyphenylbenzoylamylurethan:

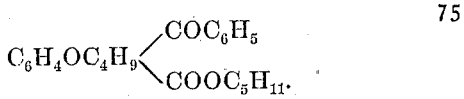

Crystallizes in the form of small white felted needles; melting point about 86° to 88° centigrade.

Having thus described my invention, what I claim as new therein, and desire to secure by Letters Patent, is—

1. As new chemical products the acidyl combinations of the para-oxyphenylurethan ethers, the composition of which combinations corresponds to the chemical formula:

in which R and R′ represent any desired alcohol radicle, and R$^s$ represents one of the described acidyl groups, acetyl, propionyl or benzoyl, such products being readily crystallizable, and more or less soluble in alcohol and benzene, and possessing antipyretic and analgesic properties.

2. The herein-described process of obtaining acidyl combinations of the ethers of para-oxyphenylurethans, which process consists in substituting an acidyl group for the hydrogen atom directly combined with the nitrogen atom of the ethers of the para-oxyphenylurethans, by heating said ethers with reagents containing the acidyl group as acetic acid anhydrid.

JOSEPH FREIHERR VON MERING.

Witnesses:
E. BAUMANN,
M. FUXIUS.